United States Patent [19]

Pinckley

[11] Patent Number: 5,519,890
[45] Date of Patent: May 21, 1996

[54] METHOD OF SELECTIVELY REDUCING SPECTRAL COMPONENTS IN A WIDEBAND RADIO FREQUENCY SIGNAL

[75] Inventor: Danny T. Pinckley, Arlington, Tex.

[73] Assignee: Motorola, Inc., Schamburg, Ill.

[21] Appl. No.: 518,127

[22] Filed: Aug. 22, 1995

Related U.S. Application Data

[63] Continuation of Ser. No. 82,631, Jun. 28, 1993, abandoned.
[51] Int. Cl.⁶ ............................................ H04B 1/10
[52] U.S. Cl. ................... 455/307; 455/250.1; 455/266; 455/308; 370/70
[58] Field of Search ........................... 455/307, 308, 455/309, 311, 312, 226.1, 250.1, 266, 295, 296; 375/260, 284, 346, 347; 370/69.1, 70; 341/132, 157, 158, 163

[56] References Cited

U.S. PATENT DOCUMENTS

| | | | |
|---|---|---|---|
| 5,271,036 | 12/1993 | Lobert et al. | 455/226.1 X |
| 5,278,870 | 1/1994 | Mays et al. | 455/307 X |
| 5,282,023 | 1/1994 | Scarpa | 455/307 X |
| 5,307,517 | 4/1994 | Rich | 455/307 X |
| 5,321,847 | 6/1994 | Johnson, Jr. | 455/308 X |

Primary Examiner—Reinhard J. Eisenzopf
Assistant Examiner—Philip J. Sobutka
Attorney, Agent, or Firm—Richard A. Sonnentag

[57] ABSTRACT

A method of selectively reducing a magnitude of spectral components of a wideband analog radio frequency (RF) signal at an input to an analog-to-digital (A/D) converter is provided. The method includes the steps of digitizing the input to the A/D converter, analyzing the digitized inputs for relatively large spectral peaks, and notch filtering the relatively large peaks to a threshold value.

21 Claims, 1 Drawing Sheet

METHOD OF SELECTIVELY REDUCING SPECTRAL COMPONENTS IN A WIDEBAND RADIO FREQUENCY SIGNAL

This is a continuation of application Ser. No. 08/082,631, filed Jun. 28, 1993, and now abandoned.

1. Field of the Invention

The field of the invention relates to communication systems and in particular to digital communication systems.

2. Background of the Invention

Digital receivers of radio frequency (RF) signals are known. Such receivers, typically, receive a signal under a analog format, frequency translate the signal to a baseband using a local oscillator, filter out unwanted signals using a bandpass filter (BPF), and convert to a digital format using a analog-to-digital (A/D) converter. Signal recovery following conversion into a digital format typically occurs within a digital signal processor (DSP) such as the Motorola 56000 DSP.

Where a group of signals on adjacent channels are to be recovered within a wideband receiver (e.g., within a cellular base station) a local oscillator frequency is chosen to translate the channel group to a low enough frequency range to be utilized by the following stages and a BPF chosen of sufficient bandwidth to pass a spectra containing the channel group. Conversion of most or all of the channel group to a digital format typically occurs within a single A/D with channel separation and recovery after conversion proceeding, after further processing, under a parallel format in separate DSPs.

While the recovery of channel groups using a single A/D converter works well, and at a significant cost advantage, difficulties are often experienced relative to the dynamic range provided by A/Ds over an input signal range. The limited dynamic range of the best of today's A/D converters is insufficient to accommodate the largest possible input signals that may occur, without limiting, while simultaneously accomodating the smallest usable input signals in a real system. Where the magnitude of one or more signals of a signal group is significantly larger than others in the group, the larger signal may act to "blind" the A/D to the lower level signals within the group. Where gain control is utilized to reduce limiting, the reduced gain also decreases a signal to noise ratio of lower level signals. Because of the importance of digital communication systems, a need exists for a means of accommodating signal groups having large dynamic ranges without limiting the A/D converter or reducing the signal to noise ratio of lower level signals

SUMMARY OF THE INVENTION

A method of selectively reducing a magnitude of spectral components of a wideband analog radio frequency (RF) signal at an input to an analog-to-digital (A/D) converter is provided. The method includes the steps of digitizing the input to the A/D converter, analyzing the digitized inputs for relatively large spectral peaks, and notch filtering the relatively large peaks to a threshold value.

DETAILED DESCRIPTION OF THE PREFERRED EMBODIMENT

The solution to the problem of accommodating signal groups having large dynamic ranges within a radio frequency broadband receiver and A/D converter lies, conceptually, in identifying and notch filtering the larger signals without affecting the lower level signals. Identification of larger signals may be accomplished by converting an output signal of an A/D converter from the time domain to the frequency domain (e.g., by fast fourier transformation) and comparison with a threshold. Areas of the frequency domain representation of the output signal identified as exceeding the threshold are then used to notch filter a corresponding spectra within the frequency domain. A control voltage of the notch filter may then be swept through the identified spectra to fine tune the notch filter.

Figure 1:
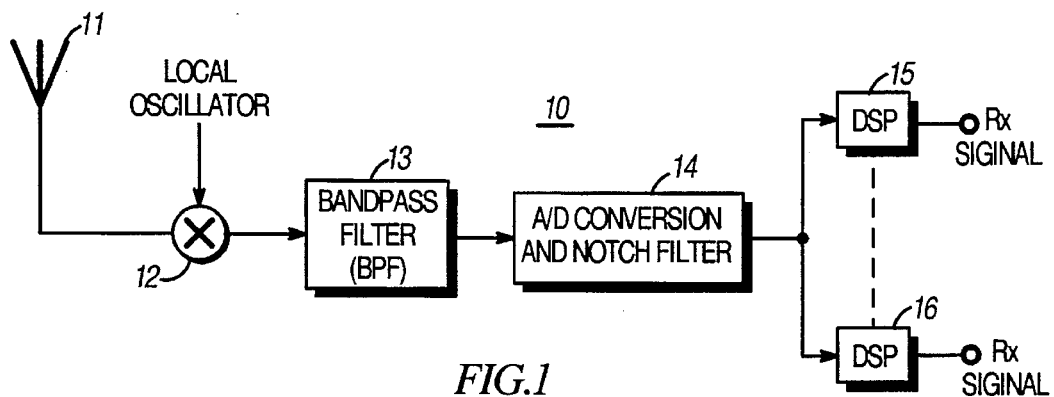
FIG. 1 is a block diagram of a digital receiver in accordance with the invention.

FIG. 1 is a broadband receiver 10 for simultaneous reception of a number of radio frequency channels (e.g., within a cellular base station). Within the receiver 10 a signal received by an antenna 11 is mixed with an output of a local oscillator, unwanted frequencies are filtered out in a bandpass filter (BPF) 13 and the output applied to an A/D converter 14. Individual channels are then isolated for transmission to a subscriber in parallel digital signal processors (DSPs) (e.g., a Motorola 56000 DSP) or other similar hardware.

Figure 2:
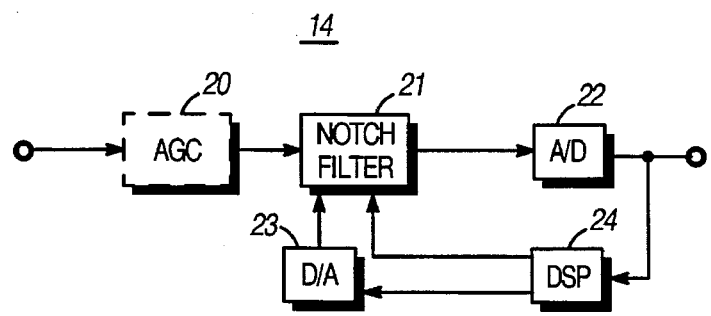
FIG. 2 is a block diagram of an A/D and notch filter assembly in accordance with the invention.

FIG. 2 is a block diagram of the A/D converter and notch filter 14 in accordance with an embodiment of the invention. Included within the A/D converter and notch filter 14 is an optional automatic gain control 20, notch filter 21, A/D 22, D/A 23, and DSP 24 (e.g., a Motorola 56000 DSP). The optional AGC may be included within the A/D converter and notch filter 14 to maintain an input signal level below a maximum level allowable by the A/D 22.

Upon application of a broadband signal from the BPF 13 to the A/D converter and notch filter 14, the A/D 22 samples and converts the broadband signal to digital samples for application to DSPs 15, 16, and 24. Within DSP 24 the sampled signal is converted from the time domain to the frequency domain using a fast fourier transform.

Figure 3:
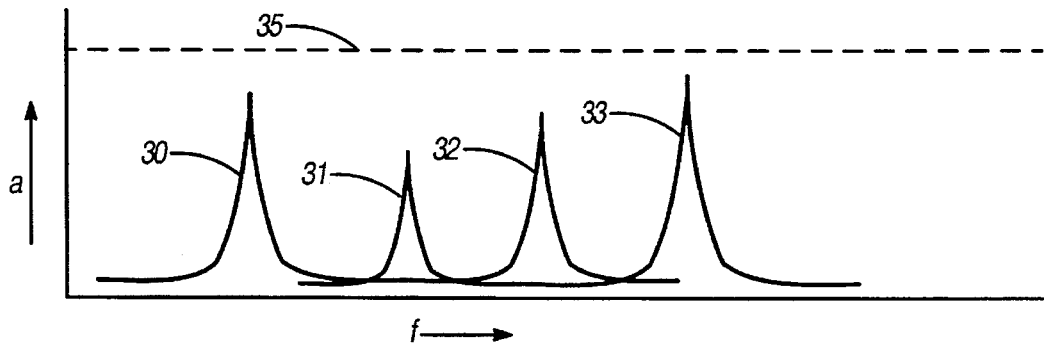
FIG. 3 is a graphical representation of four radio frequency channels in the time domain after a fast fourier transformation.

Shown in FIG. 3 is an FFT graphical representation of a broadband signal applied to the A/D converter and notch filter 14. Included within the graphical representation of the broadband signal are four radio frequency signals 30, 31, 32, and 33 of four radio channels to be decoded by the receiver 10. Under the invention the amplitude of the signals 30, 31, 32, and 33 is compared with a threshold value 35 for a determination of whether the signal 30, 31, 32, or 33 is to be notch filtered.

Under one embodiment of the invention the threshold value 35 (FIG. 4) is determined to be 90% of the A/D 22 full scale input. Upon determination that a signal 40 has exceeded the threshold the DSP 24 determines the location and spectral width of the offending carrier based upon the results of the FFT. Based upon the spectral width, location and magnitude of the offending carrier the DSP 24 transfers notch filter control parameters to the notch filter 21. The peak attenuation of the notch filter is determined by the DSP 24 to be at least the difference between the threshold value and the peak of the offending carrier 40 at a frequency $f_o$.

Figure 4:
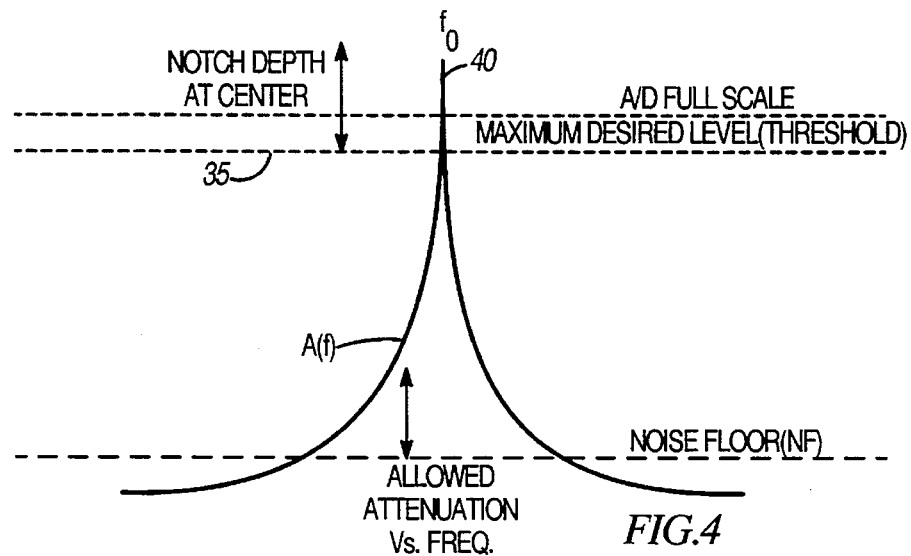
FIG. 4 is a graphical representation of a carrier to be notch filtered in accordance with the invention.

The bandwidth of the notch ($BWf_o$) with a center frequency $f_o$ is determined by the spectral width of the sideband noise around the offending carrier. The bandwidth of the notch is selected to insure that the attenuation outside the offending carrier bandwidth is less than the difference in dB of the sideband noise around the offending carrier and the thermal noise floor (NF) that is present ahead of the notch filter and A/D. By selecting the notch bandwidth (and therefore its frequency response) in this way, the signal to noise ratio of the other carriers is not degraded beyond the value that is inherent due to the sideband noise of the offending carrier. The peak attenuation and bandwidth are selected to satisfy the response given in the equations below, where atten (f) is the attenuation of the notch filter at a frequency (f), A(f) is the amplitude response of the offending carrier at the frequency (f) and NF is a noise floor (FIG. 4).

$$\text{atten } (f) \geq A(f) - \text{Threshold} \qquad \text{Equation \#1}$$

for $f_o-(BWfo/2)<f<fo+(BWfo/2)$ $$\text{atten } (f) = A(f) - NF \qquad \text{Equation \#2}$$

for $f<fo-(BWfo/2)$ or $f>fo+(BWfo/2)$, and

One of the fundamental distinguishing factors of the invention is that the notch filter response can be selected to obtain physically realizable values while not causing significant signal to noise degradation to the other carriers. A critical factor to accomplish this is that the filter response satisfies Equations #1 and 2.

Upon entry of the notch filter parameters into the notch filter 21, the DSP 24 then begins fine tuning the notch filter 21 by application of a control voltage through the D/A 23. The control voltage through D/A 23 causes the center point of the notch to change in frequency based upon the magnitude of the control voltage. To fine tune the notch filter 21 to a center frequency of the offending carrier 40, the DSP 24 causes the voltage to sweep through an area around the center point of the offending carrier 40 while comparing the FFT output of the A/D 22 with the threshold. Determination of an optimal control point is determined by the DSP 24 to be a point where the offending carrier amplitude is below the threshold and the notch filter response satisifes Equation 2.

I claim:

1. A method of selectively reducing a bandwidth of spectral components of a wideband multi-carrier analog radio frequency (RF) signal at an input to an analog-to-digital (A/D) converter having digitized samples as an output, such method comprising the steps of:

analyzing the digital samples of the carriers for relatively large spectral peaks; and applying a notch filter to the input of the analog-to-digital (A/D) converter to reduce the relatively large spectral peaks to a threshold value, whereby the notch filter is applied to selected carrier having large spectral peaks exceeding the threshold value and not to carriers having spectral peaks below the threshold value.

2. The method as in claim 1 wherein the step of applying the notch filter to reduce the spectral peaks to a threshold value further includes the step of limiting a bandwidth of the notch filter to a spectral area related to where an amplitude response of the spectral peaks exceeds a noise floor.

3. The method as in claim 1 wherein the step of analyzing the digital samples further comprising the step of converting the digitized inputs from a time domain to a frequency domain format using a fast fourier transform (FFT) to produce a FFT output.

4. The method as in claim 3 further comprising the step of comparing the FFT output with the threshold value and identifying spectra exceeding the threshold value.

5. The method as in claim 4 further comprising the step of calculating a notch depth and bandwidth based, in part, upon the FFT output and identified spectra.

6. The method as in claim 4 further comprising the step of generating at least one set of notch filter coefficients for the identified spectra.

7. A method of selectively reducing a magnitude of spectral components of a wideband multi-carrier analog radio frequency (RF) signal at an input to an analog-to-digital (A/D) converter having digitized samples as an output, such method comprising the steps of:

a) analyzing the digital samples of the carriers for relatively large spectral peaks;

b) calculating a notch depth and bandwidth required to reduce the relatively large spectral peaks to at least a threshold value;

c) selecting notch filter coefficients, based on the calculated notch depth and bandwidth,;

d) applying a notch filter, based on the selected notch filter coefficients, to the carriers analyzed to have relatively large spectral peaks to reduce the relatively large spectral peaks to at least the threshold value; and e) repeating steps (a) through (d).

8. The method as in claim 7 wherein the step of applying a notch filter to the carriers analyzed to have relatively large spectral peaks further includes the step of limiting a bandwidth of the notch filter to a spectral area related to where an amplitude response of the spectral peaks exceeds a noise floor.

9. The method as in claim 7 wherein the step of analyzing the digital samples further comprising the step of converting the digitized inputs from a time domain to a frequency domain format using a fast fourier transform (FFT) to produce a FFT output.

10. The method as in claim 9 further comprising the step of comparing the FFT output with the threshold value and identifying spectra exceeding the threshold value.

11. The method as in claim 10 further comprising the step of calculating a notch depth and bandwidth based, in part, upon the FFT output and identified spectra.

12. The method as in claim 10 further comprising the step of generating at least one set of notch filter coefficients for the identified spectra.

13. A method of selectively reducing a magnitude of spectral components of a wideband multi-carrier analog signal at an input to an analog-to-digital (A/D) converter having digitized samples as an output, such method comprising the steps of:

a) characterizing the digital samples using a fast fourier transform (FFT);

b) comparing the characterized digital samples with a threshold to identify spectra of the carriers having a magnitude of a spectral peak exceeding a threshold;

c) calculating a notch depth and bandwidth to reduce the identified spectral peak to at least the threshold;

d) selectively notch filtering the spectral peaks to at least the threshold, whereby notch filtering is applied to the spectral peaks identified as having a magnitude exceeding the threshold; and e) repeating steps (a) through (d).

14. The method as in claim 13 further comprising the step of generating at least one set of notch filter coefficients for the identified spectra.

15. The method as in claim 13 wherein the step of notch filtering the spectral peaks to a threshold value further includes the step of limiting a bandwidth of the notch filter to a spectral area related to where an amplitude response of the spectral peaks exceeds a noise floor.

16. A method of selectively reducing a magnitude of spectral components of a wideband multi-carrier analog radio frequency (RF) signal at an input to an analog-to-digital (A/D) converter of a cellular base station, the A/D converter having digitized samples as an output, such method comprising the steps of:

analyzing the digital samples of the carriers for relatively large spectral peaks; and applying a notch filter to the input of the analog-to-digital (A/D) converter to reduce the relatively large spectral peaks to a threshold value, whereby the notch filter is applied to selected carriers having large spectral peaks exceeding the threshold value and not to carriers having spectral peaks below the threshold value.

17. The method as in claim 16 wherein the step of notch filtering the relatively large spectral peaks to a threshold value further includes the step of limiting a bandwidth of the notch filter to a spectral area related to where an amplitude response of the spectral peaks exceeds a noise floor.

18. The method as in claim 16 wherein the step of analyzing the digitized inputs further comprising the step of converting the digitized inputs from a time domain to a frequency domain format using a fast fourier transform (FFT) to produce a FFT output.

19. The method as in claim 18 further comprising the step of comparing the FFT output with the threshold value and identifying spectra exceeding the threshold value.

20. The method as in claim 19 further comprising the step of calculating a notch depth and bandwidth based, in part, upon the FFT output and identified spectra.

21. The method as in claim 19 further comprising the step of generating at least one set of notch filter coefficients for the identified spectra.

\* \* \* \* \*

UNITED STATES PATENT AND TRADEMARK OFFICE
CERTIFICATE OF CORRECTION

PATENT NO. : 5,519,890
DATED : May 21, 1996
INVENTOR(S) : Pinckley, Danny

It is certified that error appears in the above-indentified patent and that said Letters Patent is hereby corrected as shown below:

Column 3, Line 55 reads "carrier having" should be --carriers having--.

Signed and Sealed this

Twenty-seventh Day of August, 1996

Attest:

BRUCE LEHMAN

*Attesting Officer*   *Commissioner of Patents and Trademarks*